(12) United States Patent
Li et al.

(10) Patent No.: US 8,385,338 B2
(45) Date of Patent: Feb. 26, 2013

(54) IMPLEMENTATION TO AVOID THE ACKNOWLEDGEMENT-IMPLOSION IN A MULTICAST GROUP

(75) Inventors: Ming Li, Cupertino, CA (US); Renwei Li, Fremont, CA (US); Weiqian Dai, San Jose, CA (US); Su Wei, Fremont, CA (US); Xuesong Dong, Pleasanton, CA (US)

(73) Assignee: Futurewei Technologies, Inc., Plano, TX (US)

( * ) Notice: Subject to any disclaimer, the term of this patent is extended or adjusted under 35 U.S.C. 154(b) by 383 days.

(21) Appl. No.: 12/757,775

(22) Filed: Apr. 9, 2010

(65) Prior Publication Data

US 2010/0272104 A1    Oct. 28, 2010

Related U.S. Application Data

(60) Provisional application No. 61/172,589, filed on Apr. 24, 2009.

(51) Int. Cl.
*H04L 12/28* (2006.01)

(52) U.S. Cl. ........ 370/390; 370/395; 370/398; 370/432; 370/510

(58) Field of Classification Search .......... 370/390, 370/395, 398, 94.1, 432, 507, 510, 229, 252, 370/244
See application file for complete search history.

(56) References Cited

U.S. PATENT DOCUMENTS

| | | | | |
|---|---|---|---|---|
| 4,617,657 A * | 10/1986 | Drynan et al. | ................ | 370/394 |
| 5,337,313 A * | 8/1994 | Buchholz et al. | ............ | 370/394 |
| 5,664,091 A * | 9/1997 | Keen | ................................ | 714/18 |
| 5,754,754 A * | 5/1998 | Dudley et al. | ................... | 714/18 |
| 5,905,871 A * | 5/1999 | Buskens et al. | ............... | 709/245 |
| 6,317,430 B1 * | 11/2001 | Knisely et al. | ................ | 370/394 |
| 6,496,481 B1 * | 12/2002 | Wu et al. | ....................... | 370/242 |
| 6,505,253 B1 * | 1/2003 | Chiu et al. | .................... | 709/235 |
| 6,507,562 B1 | 1/2003 | Kadansky et al. | | |
| 6,526,022 B1 * | 2/2003 | Chiu et al. | .................... | 370/229 |
| 6,577,599 B1 * | 6/2003 | Gupta et al. | .................. | 370/236 |
| 6,611,521 B1 * | 8/2003 | McKay et al. | ............... | 370/392 |
| 6,621,796 B1 * | 9/2003 | Miklos | .......................... | 370/236 |
| 6,834,326 B1 | 12/2004 | Wang et al. | | |
| 7,236,494 B2 * | 6/2007 | Mallory | ......................... | 370/394 |
| 7,328,393 B2 | 2/2008 | Chawla et al. | | |
| 7,395,481 B2 * | 7/2008 | Chintada et al. | .............. | 714/749 |
| 7,447,148 B2 * | 11/2008 | Gao et al. | ....................... | 370/216 |
| 7,738,553 B2 | 6/2010 | Dambrackas | | |
| 7,881,301 B2 * | 2/2011 | Seon | .............................. | 370/394 |
| 7,979,768 B2 * | 7/2011 | Sammour et al. | ............. | 714/748 |
| 8,036,101 B2 * | 10/2011 | Kim et al. | ...................... | 370/216 |
| 8,112,694 B1 * | 2/2012 | Woo et al. | ...................... | 714/774 |
| 2002/0080792 A1 * | 6/2002 | Rosier | ........................... | 370/394 |
| 2003/0191844 A1 * | 10/2003 | Meyer et al. | .................. | 709/227 |
| 2005/0111452 A1 * | 5/2005 | Mamillapalli et al. | ........ | 370/390 |
| 2005/0182995 A1 | 8/2005 | Curcio et al. | | |
| 2005/0185604 A1 * | 8/2005 | Agarwal | ........................ | 370/299 |
| 2005/0207370 A1 * | 9/2005 | Harada | ........................... | 370/321 |
| 2006/0002320 A1 | 1/2006 | Costa-Requena et al. | | |
| 2006/0245428 A1 * | 11/2006 | Yanamoto et al. | ............. | 370/394 |
| 2006/0262795 A1 * | 11/2006 | Mamillapalli et al. | ........ | 370/390 |
| 2007/0064718 A1 * | 3/2007 | Ekl et al. | ........................ | 370/432 |

(Continued)

*Primary Examiner* — Andrew Lai
*Assistant Examiner* — Andrew C Lee
(74) *Attorney, Agent, or Firm* — Conley Rose, P.C.; Grant Rodolph; Stephen R. Loe

(57) ABSTRACT

In at least some embodiments, a multicast communication system includes sender and a plurality of receivers in communication with the sender. The sender is configured to multicast a data packet to the plurality of receivers. The plurality of receivers are configured to acknowledge the data packet received from the sender based on weakest member selection without a sender-side competitive time window.

16 Claims, 6 Drawing Sheets

U.S. PATENT DOCUMENTS

| | | |
|---|---|---|
| 2007/0283026 A1 | 12/2007 | Lohmar et al. |
| 2008/0031178 A1 | 2/2008 | Vilei et al. |
| 2008/0031248 A1 * | 2/2008 | Vilei et al. ............. 370/390 |
| 2010/0251056 A1 | 9/2010 | Dinan |
| 2011/0243052 A1 | 10/2011 | Alay et al. |

* cited by examiner

IMPLEMENTATION TO AVOID THE ACKNOWLEDGEMENT-IMPLOSION IN A MULTICAST GROUP

CROSS-REFERENCE TO RELATED APPLICATIONS

The present application claims priority to U.S. Provisional Patent Application Ser. No. 61/172,589 filed Apr. 24, 2009 by Ming Li, et al. and entitled "Efficient Implementation to Avoid the ACK-Implosion in the Multicast Group," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In the past few years, numerous research projects have been carried out to explore how to support reliable multicasting in various networking environments. A well-known issue to be addressed in reliable multicasting is acknowledgement (ACK)-implosion (e.g., a sender station and/or network becoming flooded by a large number of ACK messages). As high data loads increase, the ACK-implosion problem increases.

SUMMARY

In at least some embodiments, a multicast communication system includes a sender and a plurality of receivers in communication with the sender. The sender is configured to multicast a data packet to the plurality of receivers. The plurality of receivers are configured to acknowledge the data packet received from the sender based on weakest member selection without a sender-side competitive time window In at least some embodiments, a multicast communication device includes sender logic and receiver logic. The receiver logic is configured to determine a weakest multicast member status of the communication device.

In at least some embodiments, a method includes determining, by a communication device, a weakest multicast member status of the communication device. The method also includes setting, by the communication device, an ACK timer to a predetermined non-zero value in response to the weakest multicast member status being positive.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

One proposed solution to reduce or prevent ACK-implosion involves members of a multicast group transmitting control packets to announce their highest sequence number received from a sender. Other members in the multicast group that receive a transmitted control packet compare the sequence number included in the received control packet with its own resident highest sequence number. If the resident highest sequence number is equal to or greater than the sequence number included in the received control packet, then the corresponding member does not send the control packet. Otherwise, the corresponding member transmits a multicast control packet with its highest sequence number. In order to avoid sending control packets at the same time, each receiver waits for a different time interval before sending out the control packet. This proposed mechanism uses a competitive time window on the sender-side during which receivers are allowed to multicast a control packet. After this competitive time window, the weakest sequence number in the multicast group is selected. The sender uses the weakest sequence number and releases the corresponding packets in the sending queue. Unfortunately, setting up and maintaining an appropriate competitive time window is difficult and/or inefficient due to changing multicast group sizes. Further, the sender determines the weakest sequence number only after the competitive time window timer expires.

Figure 1:
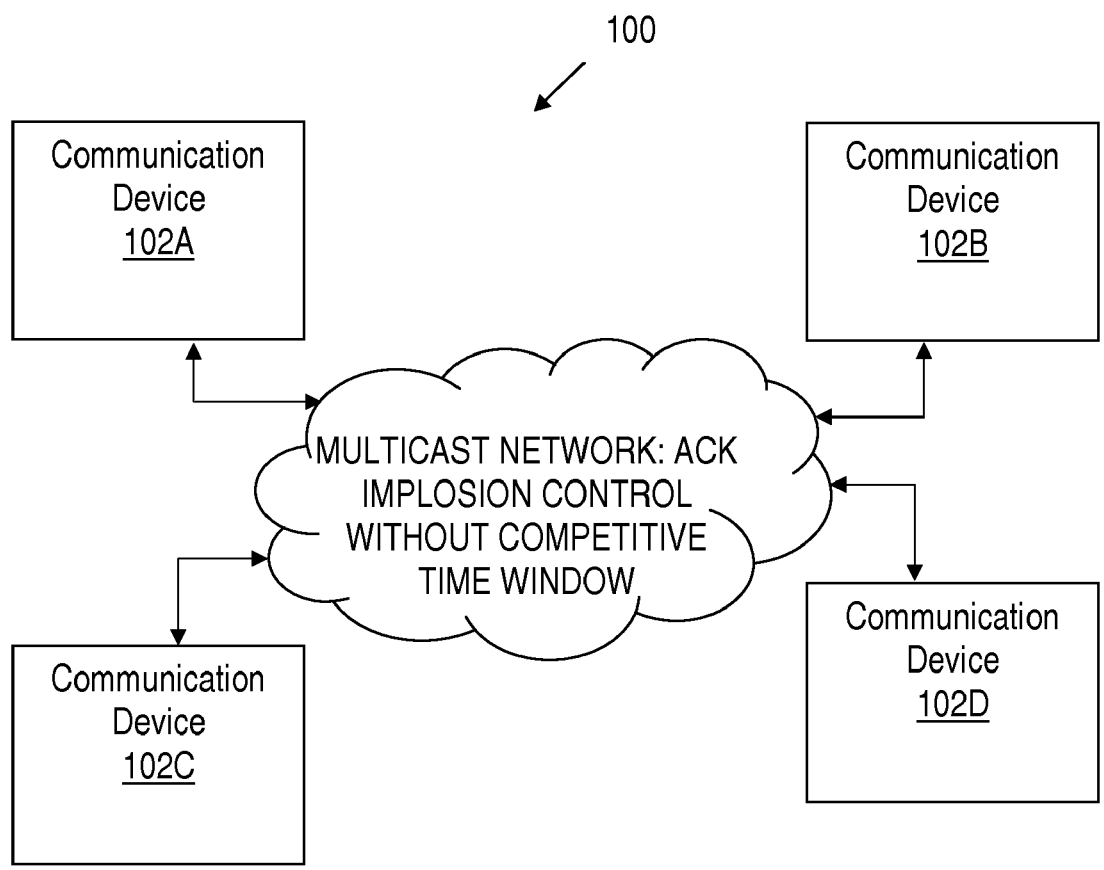
FIG. 1 illustrates a multicast communication system in accordance with an embodiment of the disclosure.

FIG. 1 illustrates a multicast communication system 100 in accordance with an embodiment of the disclosure. As shown, the multicast communication system 100 comprises a plurality of communication devices 102A-102D configured to communicate based on multicast network without a sender-side competitive time window. In at least some embodiments, the communication devices 102A-102D are part of a wireless local area network (WLAN). For example, at least one of the communication devices 102A-102D may be an access point that provides wireless data and/or communication services (e.g., telephone services, Internet services, data services, messaging services, instant messaging services, electronic mail (email) services, chat services, video services, audio services, gaming services, etc.), while the other communication devices are any of a variety of fixed-location and/or mobile wireless devices or stations (STAs). It should be appreciated that the communication system 100 is meant to be illustrative and not exhaustive. For example, it should be appreciated that more, different or fewer communication devices 102A-102D may be used to implement embodiments.

The communication devices 102A-102D may comprise any variety of personal computers (PCs) with wireless communication capabilities, a personal digital assistant (PDA) or MP3 player, a wireless telephone (e.g., a cellular phone, a smart phone, etc.), and a laptop computer with wireless communication capabilities. In at least some embodiments, the communication devices 102A-102D are implemented in accordance with at least one wired and/or wireless communication standard (e.g., from the Institute of Electrical and Electronics Engineers or IEEE (IEEE) 802.11 family of standards).

In accordance with embodiments, at least one of the communication devices 102A-102D operates as a multicast sender while the other communication devices operates as multicast receivers. It should be understood that all of the communication devices 102A-102B are capable of operating as both a multicast sender and a multicast receiver. In other words, the same communication device is able to perform multicast sender operations and multicast receiver operations as disclosed herein to reduce or prevent ACK-implosion. As previously mentioned, the multicasting performed by the communication devices 102A-102D is carried out without a sender-side competitive time window.

Figure 2:
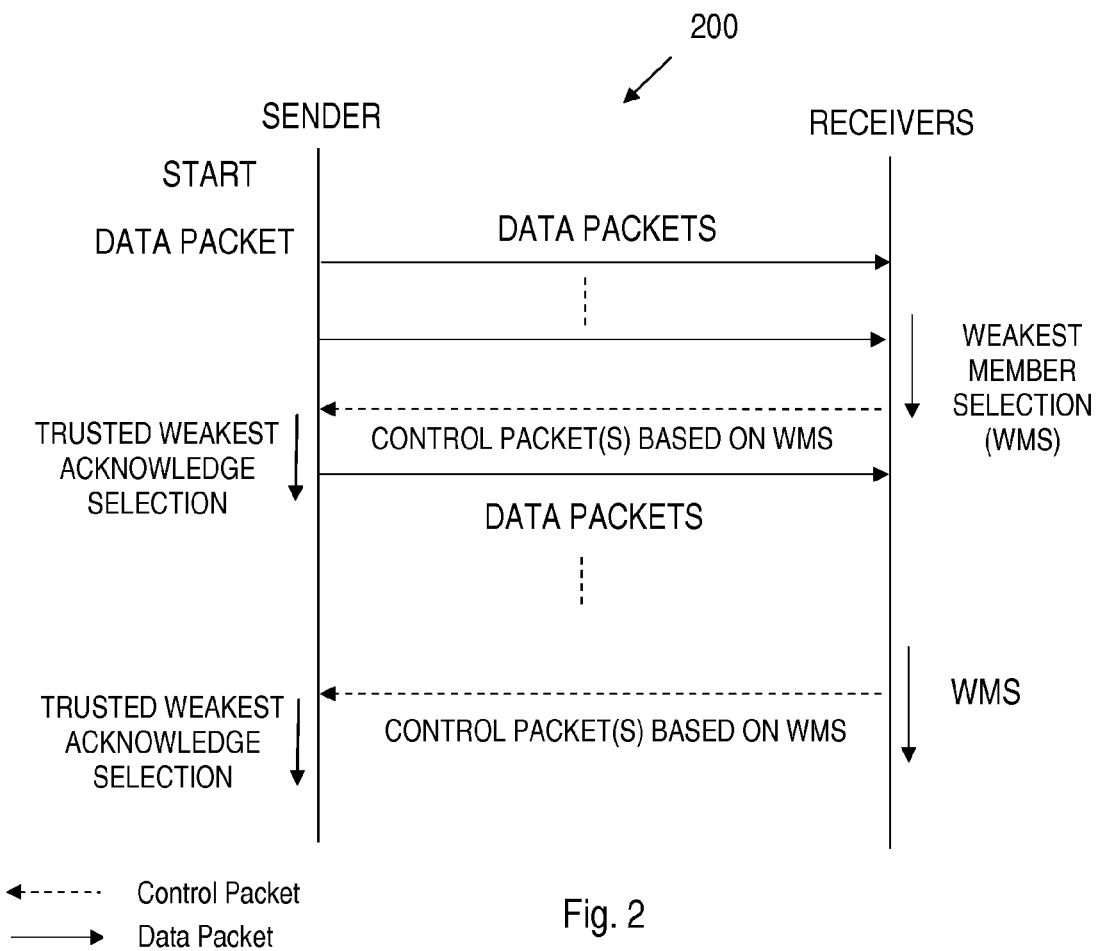
FIG. 2 illustrates a multicast communication technique in accordance with an embodiment of the disclosure.

FIG. 2 illustrates a multicast communication technique 200 in accordance with an embodiment of the disclosure. As shown, the multicast communication technique 200 comprises various sender-side operations and receiver-side operations. To start the multicast communication technique 200, the sender sends the data packets to the receivers via multicast. The receivers perform a weakest member selection (WMS) operation, where the "weakest member" may refer to the receiver that has the smallest sequence number in the previous round of ACK-reply. For example, consider a multicast group with 4 members, where $M_1$ is the sender and $M_2/M_3/M_4$ are receivers. If the highest sequence numbers for $M_2/M_3/M_4$ are 5, 4 and 6, then $M_3$ is the weakest member. Over time, the weakest member of a multicast group may change. It should be noted that the sender can continue to transmit the data packets when the receivers are performing the WMS operation.

Initially, no weakest member has been selected and all of the receivers may participate in the WMS. There are several methods to select the weakest member in the initial phase. One simple method is that the sender can specify one member as the weakest member (e.g. the sender does it through multicasting a control packet with the specified weakest member). In fact, who is the weakest member in the beginning may not be important because the initial weakest member is not necessary to be the trust weakest member recognized by the sender.

Each receiver has an ACK timer (rx_ack timer), where the rx_ack timer value is set to different values depending on the weakest member status of the receiver. If the receiver is the previous weakest member, then the rx_ack timer value is set to a predetermined non-zero value ("WEAK_ACK_TIMO"). If the receiver is not the previous weakest member, then the rx_ack timer value is set to a unique non-zero value ("ACK_TIMO") that is greater than WEAK_ACK_TIMO. However, the WEAK_ACK_TIMO must be large enough to guarantee that each other member can see the control packet sent out by the previous weakest member and can sent out its control packet to the network, if needed. ACK_TIMO should be different in each member to avoid sending control packets sending at the same time. For example, ACK_TIMO may consist of two parts: the first part is WEAK_ACK_TIMO, and the second part is a random number which is generated based on the address of the member. Because WEAK_ACK_TIMO is less than ACK_TIMO, the previous weakest member is able to send a control packet first (before other group members).

The WMS process may be started when the rx_ack timer expires in the previous weakest member. This member may send out a control packet to announce its highest sequence number received from the sender. When other members in the multicast group receive the control packet from the previous weakest member, the sequence number included in the control packet is compared with each respective highest sequence number. If a member's sequence number is equal to or greater than that the sequence number in the control packet from the previous weakest member, then this member may: 1) not send a control packet; 2) mark itself as "not weakest"; and 3) restart its rx_ack timer with the value of ACK_TIMO. The role of the rx_ack timers in the non-weakest members may be described as follows: for some reasons (e.g. the previous weakest member crashes), if the non-weakest members have not received the control packet from the previous weakest member, then the rx_ack timers in these members may expire, and they may start to bid for the weakest member. In order to avoid sending control packets at the same time, each receiver is configured to wait for a different time interval (e.g., each has a different ACK_TIMO value) before sending out a control packet. If a member's sequence number is less than the sequence number in the control packet from the previous weakest member, this member may: 1) multicast a control packet with its highest sequence number; and 2) mark itself to be "weakest"; and 3) restart its rx_ack timer with the value of WEAKEST_ACK_TIMO. When its rx_ack timer expires, it sends out the control packet and a new WMS process is started.

Figure 3:
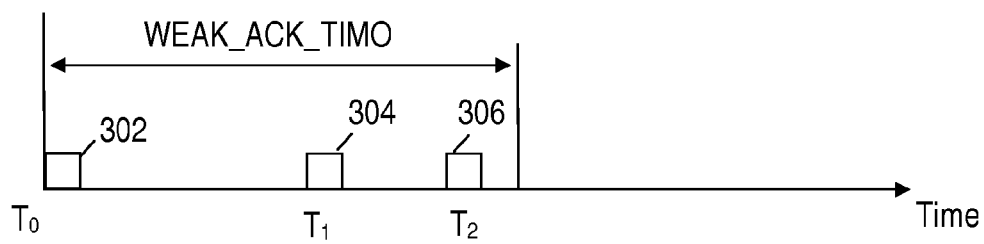
FIG. 3 illustrates reception of multicast control packets in accordance with an embodiment of the disclosure.

FIG. 3 illustrates reception of multicast control packets in accordance with an embodiment of the disclosure. At $T_0$, a member receives a control packet 302 from the previous weakest member. At $T_1$ and $T_2$, the member receives control packets 304 and 306, respectively, from the members which have the weaker sequence number (e.g. acknowledge number) than the previous weakest member. For FIG. 3, the member that sends out the control packet 306 at $T_2$ may become the new weakest member in the next round of ACK-reply.

Returning to FIG. 2, in the multicast communication technique 200, the sender receives any control packets multicast by group members. Upon receipt of a control packet from a member, the sender compares the current control packet with the previously received control packet. If both of these two control packets are from the same member and the sequence number included in the current control packet is equal to or greater than the sequence number in the previously received control packet, the sender is configured to trust the sequence number in the previously received control packet as the weakest. This trust is established because after a member multicasts a control packet, each other member may not multicast a control packet if its sequence number is equal to or greater that the sequence number of the received control packet. Thus, if the sender receives a control packet with a sequence number that is equal to or greater than the sequence number of the previous weakest member, then the weakest member status of the previous weakest member is confirmed in the current round of ACK-reply.

On the other hand, if the sequence number included in the current control packet received by the sender is not equal to or greater than the sequence number included in the control packet for the previous weakest member, then the previous weakest member status is erroneous. In such case, the sender cannot trust both the current and previous control packets. Accordingly, the sender may simply copy the current control packet into the previous control packet. If the previous control packet is the first control packet received in the multicast group, the sender may set the current control packet as the previous control packet. After the sender get the trusted weakest acknowledge number, it may remove the corresponding data packets from its retransmit queue. As shown in FIG. 2, the multicast communication technique 200 repeats the process of receivers performing WMS and the sender selecting a trusted weakest acknowledge number in accordance with WMS.

Figure 4:
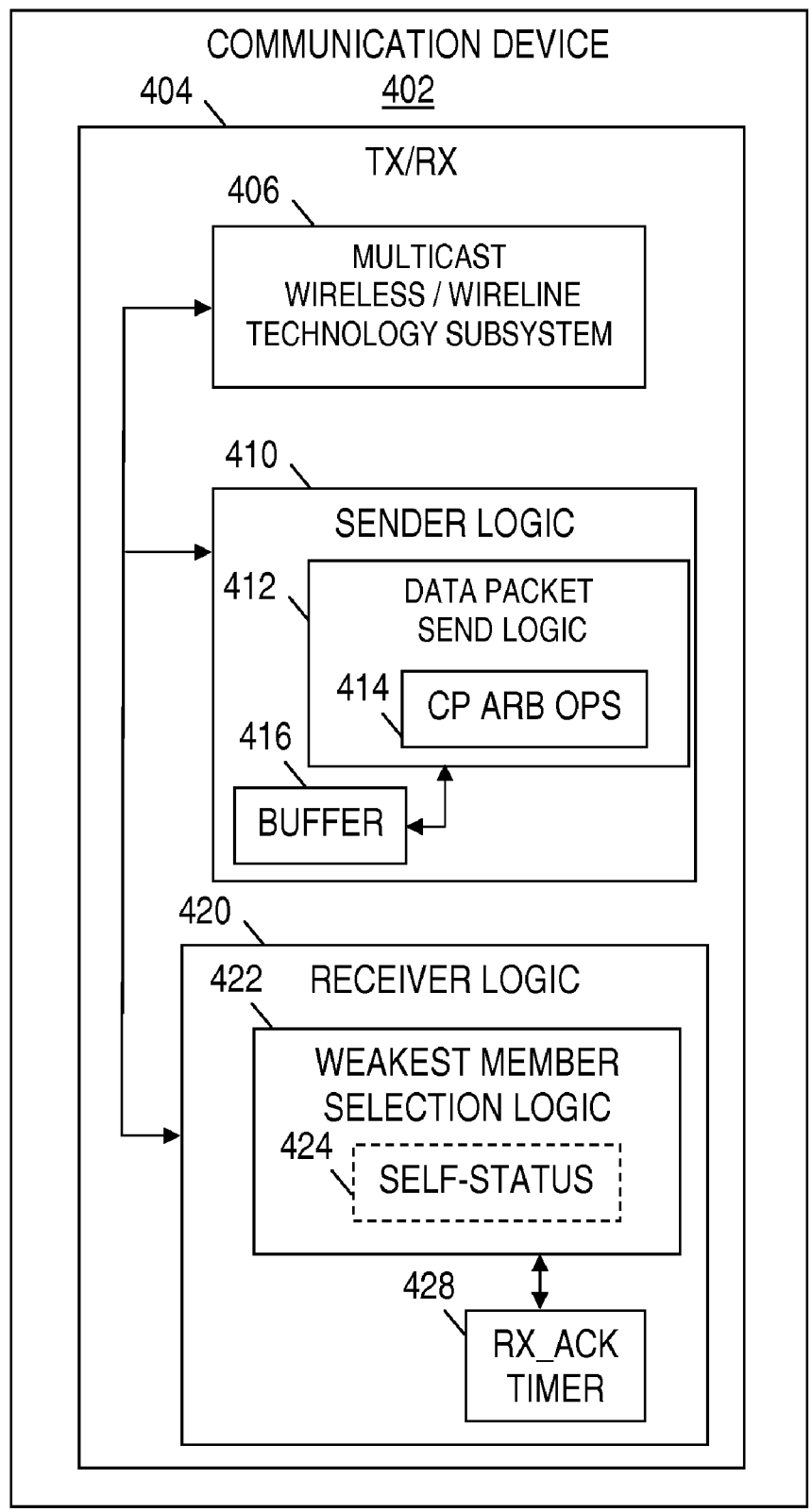
FIG. 4 illustrates a communication device in accordance with embodiments of the disclosure.

FIG. 4 illustrates a communication device 402 in accordance with embodiments of the disclosure. The communication device 402 may represent, for example, any of the communication devices 102A-102D of FIG. 1. As shown, the communication device 402 comprises a transceiver 404 with at least one multicast wireless technology subsystem 406. Examples of multicast network technologies that may be represented by the multicast wireless technology subsystem 406 include, but are not limited to, worldwide interoperability for microwave access (WiMAX) networks, wireless local area network (WLAN) networks, long term evolution (LTE) mobile telephony networks, personal area networks (PANs), wireless universal serial bus (USB) networks, BLUETOOTH (BT) networks, ZIGBEE/IEEE 801.15, etc. The multicast wireless technology subsystem 406 may comprise, for example, any of a variety of radio frequency (RF) antennas and any of a variety of wireless modems that support wireless communications. In other words, the multicast wireless/wireline technology subsystem 406 may collectively implement the "physical layer" (PHY) for the communication device 402.

As shown, the communication device 402 also comprises sender logic 410 configured to perform the sender operations described for the multicast communication technique 200 of FIG. 2. The sender logic 410 comprises the data packet send logic and control packet arbitration (CP ARB) operations 414. The CP ARB operations 414 comprise comparing the sequence numbers of received control packets. More specifically, the currently received control packet is compared with the previously received control packet. If the sequence number included in the current control packet is equal to or greater than the sequence number in the previously received control packet, the CP ARB operations 414 verify that the sequence number in the previously received control packet is the weakest. On the other hand, if the sequence number included in the current control packet received by the sender is not equal to or greater than the sequence number included in the control packet for the previous weakest member, then the CP ARB operations 414 identify the previous weakest member status as being erroneous. In such case, the sender logic 410 may simply copy the current control packet into the previous control packet. If the previous control packet is the first control packet received in the multicast group, the sender logic 410 may set the current control packet as the previous control packet. The sender logic 410 then gets the trusted weakest acknowledge number, and it may remove the corresponding data packets from its retransmit queue.

Meanwhile, the receiver logic 420 is configured to operate separately from the sender logic 410. In other words, the communication device 402 is able to operate as both a sender and a receiver of a multicast group. As shown, the receiver logic 420 comprises weakest member selection (WMS) logic 422. The WMS logic 422 is configured to perform the receiver WMS operations described previously for the multicast communication technique 200 of FIG. 2. The WMS process is performed by the WMS logic 422 when the WEAK_ACK_TIMO time window expires. If the communication device 402 is the previous weakest group member, then the RX_ACK timer value is set to WEAK_ACK_TIMO. If the communication device 402 is not the previous weakest group member or there is no previous weakest member (e.g., initially), then the RX_ACK timer value is set to ACK_TIMO. As previously discussed, ACK_TIMO is greater than WEAK_ACK_TIMO. Further, ACK_TIMO for the communication device 402 should be different than ACK_TIMO values for other multicast group members. For example, ACK_TIMO can be determined based on the address of the communication device 402.

In operation, the communication device 402 may receive control packets from other member performing WMS. Upon receipt of a control packet, the WMS logic 422 is configured to compare the sequence number of the received control packet with the sequence number of the communication device 402. If the sequence number of the communication device 402 is equal to or greater than the sequence number of the received control packet (e.g., from the previous weakest member), then the WMS logic 422 causes the communication device 402 to: 1) not send a control packet; 2) mark itself as "not weakest" in the self-status block 424 (e.g., the weakest member status of the communication device 402 is negative); and 3) restart the RX_ACK timer 428 with the value of ACK_TIMO. On the other hand, if the sequence number of the communication device 402 is less than the sequence number in the control packet from the previous weakest member, the WMS logic 422 causes the communication device 402 to: 1) multicast a control packet with its highest sequence number; and 2) mark itself to be "weakest" in the self-status block 424, 3) restart the RX_ACK timer 428 with the value of WEAK_ACK_TIMO (e.g., the weakest member status of the communication device 402 is positive). Assuming the communication device 402 maintains its weakest member status (e.g., no control packets with a lower sequence number are received during the ACK-reply round), the RX_ACK timer value is set to WEAK_ACK_TIMO. In accordance with at least some embodiments, the sender-side and receiver-side operations disclosed herein are Media Access (MAC) layer operations.

Figure 5:
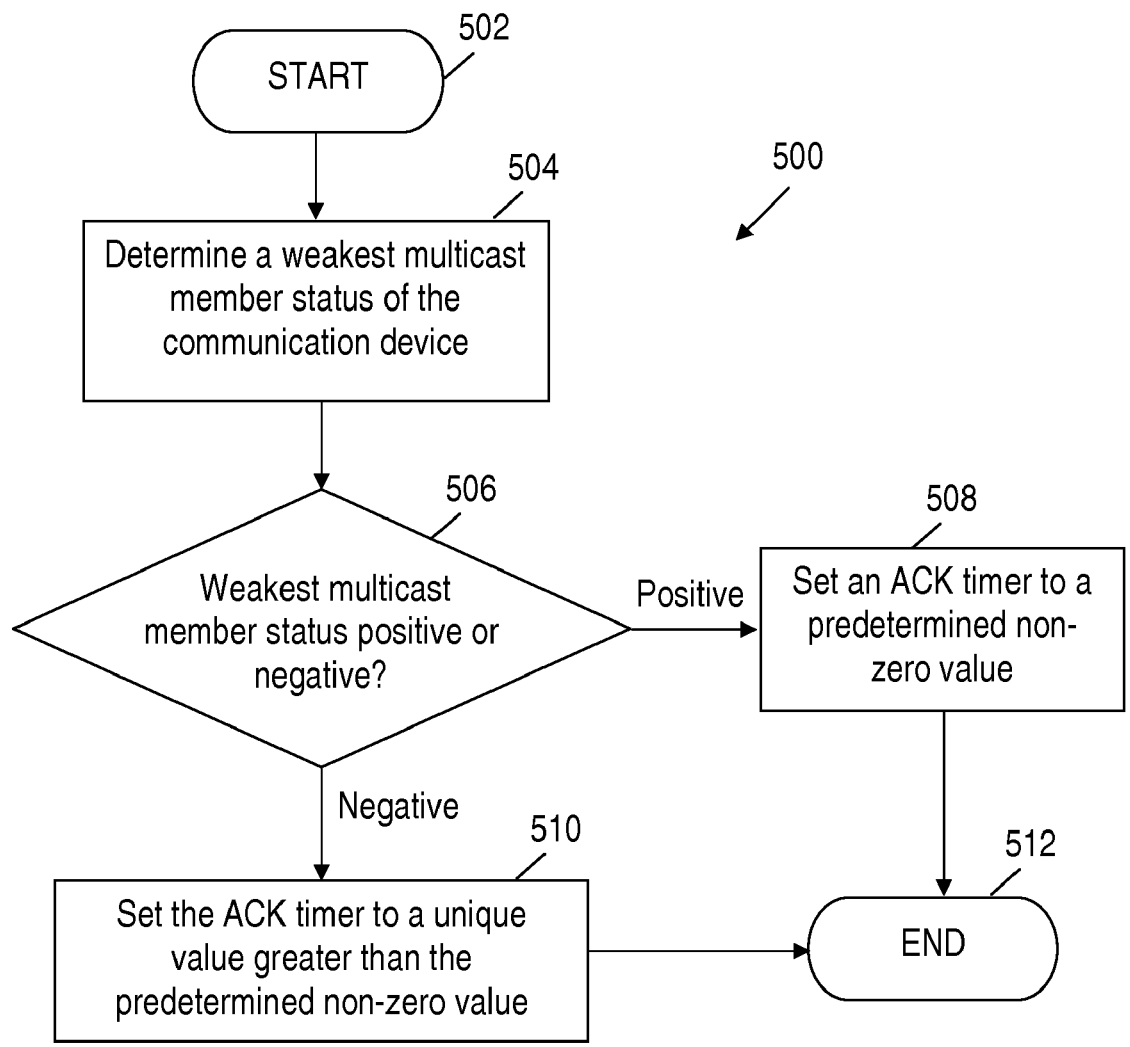
FIG. 5 illustrates a multicast receiver method in accordance with an embodiment of the disclosure.

FIG. 5 illustrates a multicast receiver method 500 in accordance with an embodiment of the disclosure. The method 500 may be selectively performed by a communication device such as the communication devices 102A-102D or the communication device 402. As shown, the method 500 starts at block 502 and continues to block 504 where a weakest multicast member status of the communication device is determined. If the weakest multicast member status of the communication device is positive (determination block 506), the ACK timer is set to a predetermined non-zero value (block 508). If the weakest multicast member status of the communication device is negative (determination block 506), the ACK timer is set to a unique value greater than the predetermined non-zero value (block 510). The method 500 ends after blocks 508 and 510 at block 512. The method 500 may be repeated many times in conjunction with a WMS technique implemented by a multicast receiver to control ACK-implosion without a sender-side competitive time window.

Figure 6:
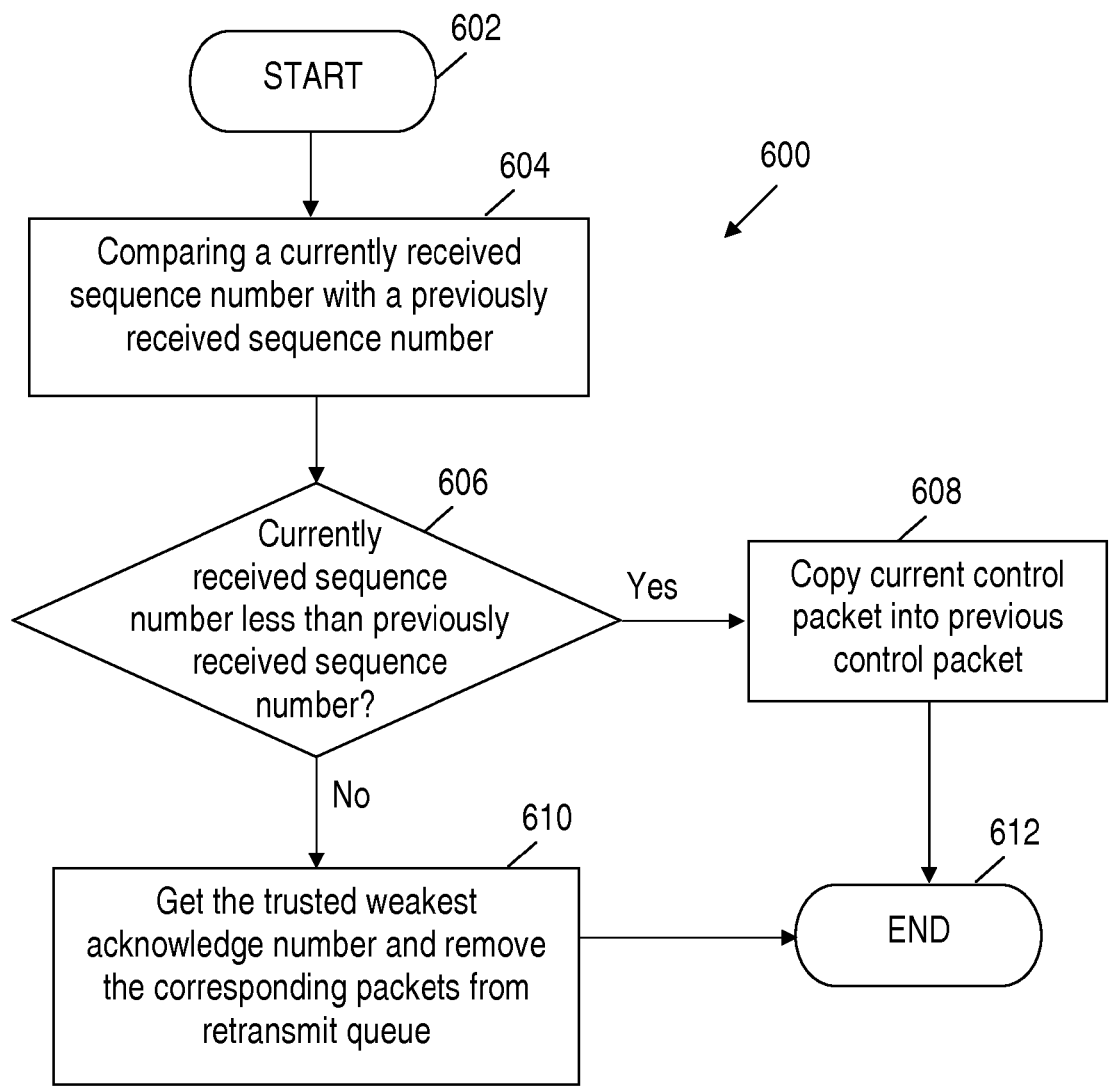
FIG. 6 illustrates a multicast sender method in accordance with an embodiment of the disclosure.

FIG. 6 illustrates a multicast sender method 600 in accordance with an embodiment of the disclosure. The method 600 may be selectively performed by a communication device such as the communication devices 102A-102D or the communication device 402. As shown, the method 600 starts at block 602 and continues to block 604 where a currently received sequence number is compared with a previously received sequence number. The sequence numbers may be included, for example, with control packets transmitted by multicast group members. If the currently received sequence number is less than the previously received sequence number (determination block 606), the current control packet is copied into the previous control packet (block 608). Alternatively, if the previous control packet is the first control packet received in the multicast group, the sender may set the current control packet as the previous control packet. Meanwhile, if the currently received sequence number is not less than the previously received sequence number and both of these two sequence numbers are from the same member (based on WMS, they should be from the same member) (determination block 606), the trusted weakest acknowledgment number is got and the corresponding data packets in the retransmit queue can be removed (block 610). The method 600 ends after blocks 608 and 610 at block 612. The method 600 may be repeated many times in conjunction with a WMS technique implemented by a multicast sender to control ACK-implosion without a sender-side competitive time window.

Figure 7:
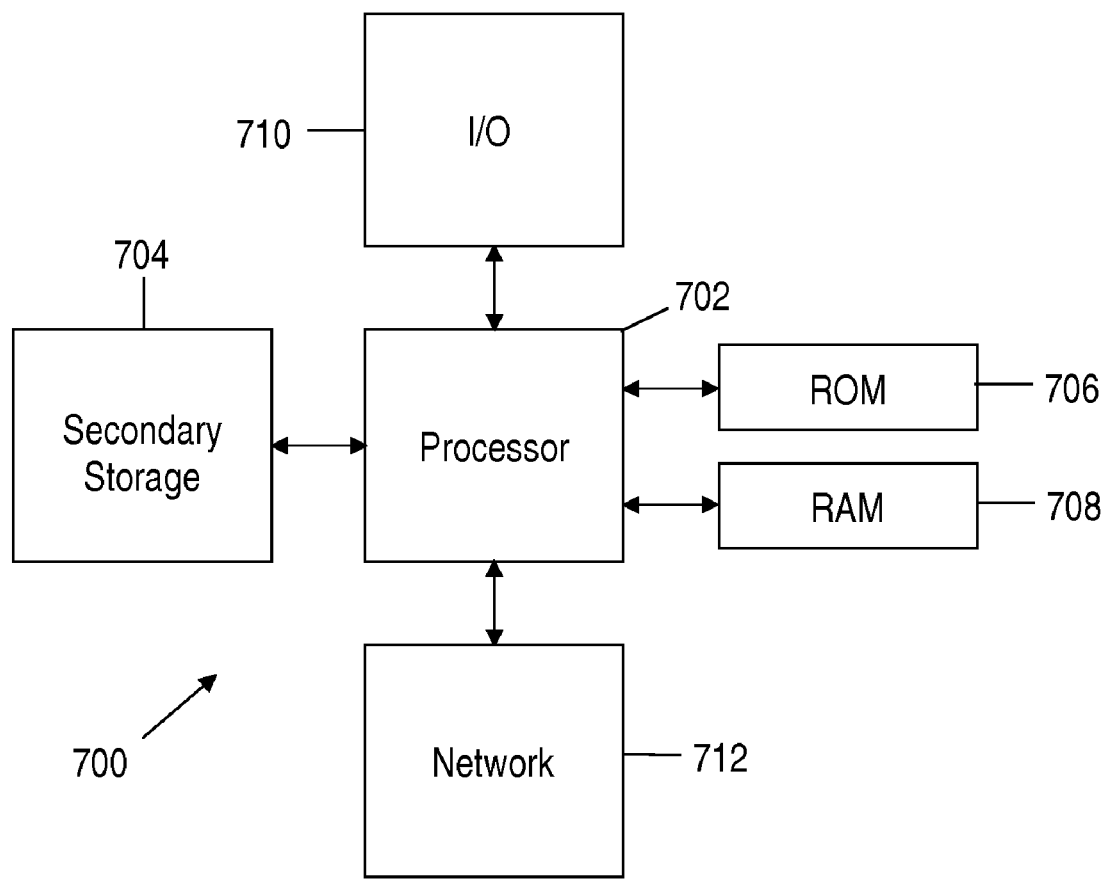
FIG. 7 illustrates a computer system in accordance with an embodiment of the disclosure.

The ACK-implosion control technique described herein may be implemented on any general-purpose communication device with sufficient processing power, memory resources, and network throughput capability to handle the necessary workload placed upon it. FIG. 7 illustrates a typical, general-purpose communication device 700 suitable for implementing one or more embodiments of the components disclosed herein. The communication device 700 comprises a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips, or may be part of one or more application specific integrated circuits (ASICs).

The secondary storage 704 is typically comprised of one or more disk drives or tape drives and is used for non-volatile storage of data and as an over-flow data storage device if RAM 708 is not large enough to hold all working data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, e.g., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A multicast communication system, comprising:
   a sender; and
   a plurality of receivers in communication with the sender,
   wherein the sender is configured to send a plurality of multicast data packets each having an incrementally larger sequence number to the receivers,
   wherein the sequence numbers comprise a first sequence number greater than zero and a second sequence number greater than the first sequence number,
   wherein all of the receivers receive all of the multicast data packets up to the first sequence number and less than all of the receivers receive all of the multicast data packets greater than the first sequence number up to the second sequence number,
   wherein one of the receivers does not receive the multicast data packets with sequence numbers greater than the first sequence number and up to the second sequence number, wherein the one receiver is configured to determine whether a maximum sequence number it received is less than the second sequence number, wherein the first receiver is configured to acknowledge to the sender receipt of the data packets up to the maximum sequence number if the maximum sequence number is less than the second sequence number, and wherein the sender is configured to resend the multicast data packets having sequence numbers greater than the first maximum sequence number.

2. A multicast communication system, comprising:
a sender; and
a plurality of receivers in communication with the sender, wherein the sender is configured to multicast a data packet to the plurality of receivers,
wherein the plurality of receivers are configured to acknowledge the data packet received from the sender based on weakest member selection without a sender-side competitive time window,
wherein at least one of the receivers comprises an acknowledgement (ACK) timer that is set to a predetermined non-zero value based on a weakest member status of its corresponding receiver,
wherein each ACK timer that is not set to the predetermined non-zero value is set to a unique time value greater than the predetermined non-zero value, and
wherein each unique time value is determined based on a corresponding receiver's address.

3. A multicast communication system, comprising:
a sender; and
a plurality of receivers in communication with the sender, wherein the sender is configured to multicast a data packet to the plurality of receivers,
wherein the plurality of receivers are configured to acknowledge the data packet received from the sender based on weakest member selection without a sender-side competitive time window,
wherein at least one of the receivers comprises an acknowledgement (ACK) timer that is set to a predetermined non-zero value based on a weakest member status of its corresponding receiver, and
wherein the plurality of receivers are configured to receive multicast control packets from each other and compare sequence numbers for said weakest member selection.

4. The communication system of claim 3, wherein upon receiving a multicast control packet from another receiver, each receiver is configured to compare its own sequence number to a sequence number provided with the received multicast control packet and, if its own sequence number is less than the received sequence number, to send a multicast control packet with its own sequence number.

5. The communication system of claim 3, wherein upon receiving a multicast control packet from another receiver, each receiver is configured to compare its own sequence number to a sequence number provided with the multicast control packet and, if its own sequence number is equal to or greater than the received sequence number, to not send a multicast control packet and to mark itself as not weakest.

6. A multicast communication system, comprising:
a sender; and
a plurality of receivers in communication with the sender, wherein the sender is configured to multicast a data packet to the plurality of receivers,
wherein the plurality of receivers are configured to acknowledge the data packet received from the sender based on weakest member selection without a sender-side competitive time window,
wherein the sender is configured to receive multicast control packets from the plurality of receivers and to compare a first sequence number provided with a currently received control packet to a second sequence number provided with a previously received control packet, and
wherein if the first sequence number is less than the second sequence number and both of the first sequence number and the second sequence number are from the same member, the sender determines that the second sequence number was received from a weakest member of the plurality of receivers.

7. The communication system of claim 6, wherein if the first sequence number is equal or greater than the second sequence number, the sender copies the currently received control packet into the previously received control packet.

8. A multicast communication device, comprising:
a receiver configured to receive a plurality of multicast data packets from a sender, wherein each multicast data packet comprises an incrementally larger sequence number, and wherein the receiver is further configured to receive from a plurality of other devices a plurality of first control messages that are not sent to the sender;
a transmitter configured to either send or refrain from sending to the sender an acknowledgement message indicating receipt of the multicast data packets, wherein the transmitter is configured to either send or refrain from sending to the other devices a plurality of second control messages that are not sent to the sender; and
a processor coupled to the transmitter and the receiver, wherein the processor is configured to:
determine a first highest sequence number in the multicast data packets received by the multicast communication device;
determine a second highest sequence number in the multicast data packets received by the other devices;
determine whether the first highest sequence number is less than the second highest sequence number;
instruct the transmitter to acknowledge to the sender receipt of multicast data packets up to the first highest sequence number if the first highest sequence number is less than the second highest sequence number, and
instruct the transmitter not to acknowledge to the sender receipt of multicast data packets up to the first highest sequence number if the first highest sequence number is not less than the second highest sequence number.

9. The multicast communication device of claim 8 further comprising an acknowledgement timer, wherein the processor does not determine whether the first highest sequence number is less than the second highest sequence number until the acknowledgement timer expires, and wherein the acknowledgment timer is longer in duration than other acknowledgment timers at the other devices.

10. A multicast communication device, comprising:
a transmitter;
a receiver; and
a processor coupled to the transmitter and the receiver,
wherein the processor is configured to determine a weakest multicast member status of the communication device, and
wherein the receiver logic is configured to determine the weakest multicast member status of the communication device by comparing a sequence number associated with the communication device with any sequence members received from other multicast members.

11. A multicast communication device, comprising:
a transmitter;
a receiver; and a processor coupled to the transmitter and the receiver,
wherein the processor is configured to determine a weakest multicast member status of the communication device,
wherein the receiver logic comprises an acknowledgement (ACK) timer that is set to a predetermined non-zero value in response to the weakest multicast member status of the communication device being positive, and
wherein the ACK timer is set to a unique time value greater than the predetermined non-zero value in response to the weakest multicast member status of the communication device being negative.

12. The communication device of claim 11, wherein the unique time value is determined based on an address of the communication device.

13. A multicast communication device, comprising:
a transmitter;
a receiver; and
a processor coupled to the transmitter and the receiver,
wherein the processor is configured to determine a weakest multicast member status of the communication device,
wherein the sender logic is configured to remove the data packets corresponding to a sequence number associated with a verified weakest multicast member, and
wherein the verification comprises determining that a first sequence number from a previously received multicast control packet is less than a second sequence number from a currently received multicast control packet and both the first sequence number and the second sequence number are from the same member.

14. A method comprising:
determining, by a multicast communication device, a weakest multicast member status of the communication device;
setting, by the multicast communication device, an acknowledgement (ACK) timer to a predetermined non-zero value in response to the weakest multicast member status being positive; and
setting, by the communication device, the ACK timer to a unique time value greater than the predetermined non-zero value in response to the weakest multicast member status being negative.

15. The method of claim 14 further comprising determining, by the communication device, the unique time value based on a unique address of the communication device.

16. A method comprising:
determining, by a multicast communication device, a weakest multicast member status of the communication device;
setting, by the multicast communication device, an acknowledgement (ACK) timer to a predetermined non-zero value in response to the weakest multicast member status being positive; and
verifying, by the communication device, a weakest multicast member by determining that a first sequence number from a previously received multicast control packet is less than a second sequence number from a currently received multicast control packet and both of the control packets are from the same member.

* * * * *